US008865279B2

(12) United States Patent
Ting

(10) Patent No.: US 8,865,279 B2
(45) Date of Patent: Oct. 21, 2014

(54) REINFORCED POLYPHTHALAMIDE/POLY(PHENYLENE ETHER) COMPOSITION

(71) Applicant: SABIC Innovative Plastics IP B.V., Bergen op Zoom (NL)

(72) Inventor: Sai-Pei Ting, Slingerlands, NY (US)

(73) Assignee: Sabic Global Technologies B.V. (NL)

( * ) Notice: Subject to any disclaimer, the term of this patent is extended or adjusted under 35 U.S.C. 154(b) by 0 days.

(21) Appl. No.: 13/801,366

(22) Filed: Mar. 13, 2013

(65) Prior Publication Data

US 2014/0248451 A1  Sep. 4, 2014

Related U.S. Application Data

(60) Provisional application No. 61/772,469, filed on Mar. 4, 2013, provisional application No. 61/772,499, filed on Mar. 4, 2013.

(51) Int. Cl.

| B29D 22/00 | (2006.01) |
|---|---|
| B29D 23/00 | (2006.01) |
| C09D 5/18 | (2006.01) |
| C09K 21/00 | (2006.01) |
| C09K 21/06 | (2006.01) |
| C09K 21/14 | (2006.01) |
| C08K 5/00 | (2006.01) |
| C08K 5/5313 | (2006.01) |
| C08K 7/02 | (2006.01) |
| C08K 5/49 | (2006.01) |
| C08K 5/16 | (2006.01) |
| C08L 77/06 | (2006.01) |
| C08L 77/00 | (2006.01) |
| C08L 77/12 | (2006.01) |
| C08L 71/00 | (2006.01) |
| C08L 79/00 | (2006.01) |

(52) U.S. Cl.
CPC . *C08L 79/00* (2013.01); *C08K 5/16* (2013.01); *C08L 77/06* (2013.01); *B29D 22/00* (2013.01); *C09K 21/06* (2013.01); *C08K 5/00* (2013.01); *B29D 23/00* (2013.01); *C09D 5/18* (2013.01); *C08K 5/5313* (2013.01); *C08K 7/02* (2013.01); *C08K 5/49* (2013.01); *C08L 77/00* (2013.01); *C09D 5/185* (2013.01); *C09K 21/00* (2013.01); *C09K 21/14* (2013.01); *C08L 77/12* (2013.01); *C08L 71/00* (2013.01)
USPC ... 428/35.7; 428/36.4; 428/474.4; 106/15.05; 106/18.11; 106/18.14; 106/18.21; 106/18.31; 106/18.32; 524/115; 524/126; 252/601; 252/606

(58) Field of Classification Search
CPC .......... C09D 5/18; C09D 5/185; C09K 21/00; C09K 21/06; C09K 21/14; B29D 22/00; B29D 23/00; C08K 5/00; C08K 5/5313; C08K 7/02; C08K 5/49; C08K 5/16; C08L 77/06; C08L 77/00; C08L 77/12; C08L 71/00

USPC .............. 428/35.7, 36.4, 474.4; 106/15.05, 106/18.11, 18.14, 18.21, 18.31, 18.32; 524/115, 126; 252/601, 606
See application file for complete search history.

(56) References Cited

U.S. PATENT DOCUMENTS

| 4,200,707 A | 4/1980 | Richardson |
|---|---|---|
| 4,565,684 A | 1/1986 | Tibbetts et al. |
| 4,572,813 A | 2/1986 | Arakawa |
| 4,663,230 A | 5/1987 | Tennent |
| 4,816,289 A | 3/1989 | Komatsu et al. |
| 4,876,078 A | 10/1989 | Arakawa et al. |
| 5,024,818 A | 6/1991 | Tibbetts et al. |
| 5,132,365 A | 7/1992 | Gallucci |
| 5,165,909 A | 11/1992 | Tennent et al. |
| 5,397,838 A | 3/1995 | Ohtomo et al. |
| 5,468,530 A | 11/1995 | Gotz et al. |
| 5,576,387 A | 11/1996 | Chambers |
| 5,589,152 A | 12/1996 | Tennent et al. |
| 5,591,382 A | 1/1997 | Nahass et al. |
| 5,843,340 A | 12/1998 | Silvi et al. |
| 5,916,970 A | 6/1999 | Lee, Jr. et al. |
| 6,111,016 A | 8/2000 | Katayama et al. |
| 6,284,830 B1 | 9/2001 | Gottschalk et al. |
| 6,423,768 B1 | 7/2002 | Khouri |
| 6,531,529 B2 | 3/2003 | Bersted et al. |

(Continued)

FOREIGN PATENT DOCUMENTS

| EP | 0183195 A2 | 6/1986 |
|---|---|---|
| EP | 0501175 A1 | 9/1992 |

(Continued)

OTHER PUBLICATIONS

International Search Report for International Application No. PCT/US2009/038391, International Application Filing Date Mar. 26, 2009, Date of Mailing Nov. 9, 2009, 9 pages.

(Continued)

*Primary Examiner* — Michael C Miggins
(74) *Attorney, Agent, or Firm* — Cantor Colburn LLP

(57) ABSTRACT

Disclosed herein is a reinforced composition comprising: 55 to 80 wt % of a compatibilized blend of a polyphthalamide and a poly(phenylene ether) wherein said compatibilized blend is formed from a mixture of polyphthalamide and poly(phenylene ether) in a ratio of between 1.5:1 and 7.0:1, and a functionalizing agent in an amount sufficient to effect compatibilization; and 20 to 45 wt % of a nylon glass fiber, wherein the composition contains less than 0.1 wt % of phosphinates and less than 0.1 wt % of impact modifiers and weight percent is based on the total weight of the composition.

44 Claims, No Drawings

(56) References Cited

U.S. PATENT DOCUMENTS

| | | |
|---|---|---|
| 6,531,530 B2 | 3/2003 | Asano |
| 6,593,411 B2 | 7/2003 | Koevoets et al. |
| 6,599,446 B1 | 7/2003 | Todt et al. |
| 6,630,526 B2 | 10/2003 | Heinen et al. |
| 6,767,941 B2 | 7/2004 | Van Der Spek et al. |
| 7,205,345 B2 | 4/2007 | Harashina |
| 7,226,963 B2 | 6/2007 | Koevoets et al. |
| 2003/0216533 A1 | 11/2003 | Sicken et al. |
| 2005/0014874 A1 | 1/2005 | Hoerold et al. |
| 2005/0250885 A1 | 11/2005 | Mercx et al. |
| 2006/0041046 A1 | 2/2006 | Mhetar et al. |
| 2006/0058432 A1 | 3/2006 | Perego et al. |
| 2006/0069471 A1 | 3/2006 | Makela |
| 2006/0111484 A1 | 5/2006 | Fishburn |
| 2006/0167144 A1 | 7/2006 | Borade et al. |
| 2007/0040154 A1 | 2/2007 | Murakami |
| 2007/0299171 A1 | 12/2007 | Couillens et al. |
| 2009/0242844 A1 | 10/2009 | Elkovitch |
| 2009/0292051 A1 | 11/2009 | Li et al. |

FOREIGN PATENT DOCUMENTS

| | | |
|---|---|---|
| EP | 0699708 A2 | 3/1996 |
| WO | 2005118698 A1 | 12/2005 |
| WO | 2006009983 A1 | 1/2006 |
| WO | 2006055732 A2 | 5/2006 |
| WO | 2007126644 A1 | 11/2007 |

OTHER PUBLICATIONS

Written Opinion for International Application No. PCT/US2009/038391, International Application Filing Date Mar. 26, 2009, Date of Mailing Nov. 9, 2009, 5 pages.

Schmitt, "Phosphorus-based flame retardants for thermoplastics", Plastics Additives & Compounding, May/Jun. 2007, pp. 26-30.

International Search Report for International Application No. PCT/US2014/020236, Application Filing Date Mar. 4, 2014, Date of Mailing Jun. 18, 2014, 7 pages.

Written Opinion for International Application No. PCT/US2014/020236, Application Filing Date Mar. 4, 2014, Date of Mailing Jun. 18, 2014, 7 pages.

REINFORCED POLYPHTHALAMIDE/POLY(PHENYLENE ETHER) COMPOSITION

CROSS REFERENCE TO RELATED APPLICATIONS

This application claims the benefit of U.S. Provisional Application Nos. 61/772,469 and 61/772,499 filed on Mar. 4, 2013 which are incorporated by reference herein in their entirety.

BACKGROUND OF INVENTION

This application relates to polyphthalamide/poly(phenylene ether) blends and more particularly to reinforced polyphthalamide/poly(phenylene ether) blends.

Glass filled poly(phenylene ether)/polyamide 66 (GF-PPE/PA66) blends have been used in applications such as water pumps and water meters for long time. The morphology of PPE/PA66 blends can be defined as "islands-and-sea" where PPE particles are the dispersed phase (as islands) and PA66 is the continuous phase (as sea). As a result, PPE/PA66 blends are commonly recognized in industry as modified nylons with superior performance such as higher heat resistance, better dimension stability, less warpage and sagging, and less moisture absorption. Yet due to the inherent nature of PA66, PPE/PA66 blends are also susceptible to moisture induced property changes such as reduction of flexural modulus and tensile strength as the moisture content in the nylon matrix increases. In some cases when elevated temperatures are employed and/or aggressive chemicals are added such as chlorine in order to purify water, neat GF PA66 and GF PPE/PA66 blends may result in earlier part failure caused by severe nylon hydrolysis.

There is an ongoing need in the art for reinforced polyamide (nylon) blends with improved high temperature hydrolytic stability.

BRIEF DESCRIPTION OF THE INVENTION

The above-described and other drawbacks are alleviated by a reinforced composition comprising 55 to 80 weight percent (wt %) of a compatibilized blend of a polyphthalamide and a poly(phenylene ether) wherein said compatibilized blend is formed from a mixture of polyphthalamide and poly(phenylene ether) in a ratio of between 1.5:1 and 7.0:1, and a functionalizing agent in an amount sufficient to effect compatibilization; and 20 to 45 wt % of a nylon glass fiber, wherein the composition contains less than 0.1 wt % of phosphinates and less than 0.1 wt % of impact modifiers and weight percent is based on the total weight of the composition.

In another embodiment a reinforced composition comprises 55 to 80 wt % of a compatibilized blend of a polyphthalamide comprising (a) 60-70 mol % of units of formula (I)

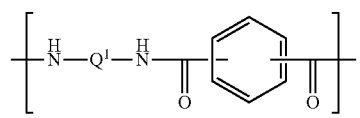

wherein $Q^1$ is a 1,6-hexyl group and the aromatic portion of the repeating unit is derived from terephthalic acid, (b) 20-30 mol % of units of formula (I) wherein $Q^1$ is a 1,6-hexyl group and the aromatic portion of the repeating unit is derived from isophthalic acid, and (c) 5-15 mol % of units of formula (II)

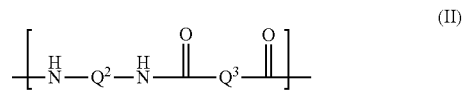

wherein $Q^2$ is a 1,4-butyl group and $Q^3$ is a 1,6-hexyl group, and a poly(phenylene ether) comprising 2,6-dimethyl-1,4-phenylene ether units wherein said compatibilized blend is formed from a mixture of said polyphthalamide and poly(phenylene ether) in a ratio of between 1.5:1 and 7.0:1, and 0.2 to 0.9 weight percent citric acid; and 20 to 45 wt % of a nylon glass fiber, wherein the composition contains less than 0.1 wt % of phosphinates and less than 0.1 wt % of impact modifiers and weight percent is based on the total weight of the composition.

In another embodiment an article comprises a reinforced composition comprising 55 to 80 wt % of a compatibilized blend of a polyphthalamide and a poly(phenylene ether) wherein said compatibilized blend is formed from a mixture of polyphthalamide and poly(phenylene ether) in a ratio of between 1.5:1 and 7.0:1, and a functionalizing agent in an amount sufficient to effect compatibilization; and 20 to 45 wt % of a nylon glass fiber, wherein the composition contains less than 0.1 wt % of phosphinates and less than 0.1 wt % of impact modifiers and weight percent is based on the total weight of the composition.

In another embodiment an article comprises 55 to 80 weight percent (wt %) of a compatibilized blend of a polyphthalamide comprising (a) 60-70 mol % of units of formula (I)

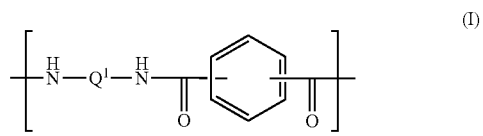

wherein $Q^1$ is a 1,6-hexyl group and the aromatic portion of the repeating unit is derived from terephthalic acid, (b) 20-30 mol % of units of formula (I) wherein $Q^1$ is a 1,6-hexyl group and the aromatic portion of the repeating unit is derived from isophthalic acid, and (c) 5-15 mol % of units of formula (II)

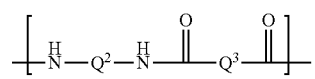

wherein $Q^2$ is a 1,4-butyl group and $Q^3$ is a 1,6-hexyl group, and a poly(phenylene ether) comprising 2,6-dimethyl-1,4-phenylene ether units wherein said compatibilized blend is formed from a mixture of said polyphthalamide and poly(phenylene ether) in a ratio of between 1.5:1 and 7.0:1, and 0.2 to 0.9 weight percent citric acid; and 20 to 45 wt % of a nylon glass fiber, wherein the composition contains less than 0.1 wt % of phosphinates and less than 0.1 wt % of impact modifiers and weight percent is based on the total weight of the composition.

Also disclosed herein is a method of making the reinforced composition.

DETAILED DESCRIPTION OF THE INVENTION

Polyphthalamides (PPA) are semi-aromatic, high temperature nylons that typically have melting points higher than 290° C. and glass transitions temperatures greater than 80° C. PPAs are generally based on polyamide 6T. However polyamide 6T has a melting point of 370° C., and therefore is difficult to process and/or blend with other polymers, such as polyphenylene ether (PPE). PPAs generally are copolymers that have various ratios of polyamide 6T, polyamide 6I, and polyamide 6/6 to control properties such as melt flow, melting point, and glass transition temperature. PPAs are distinct from high temperature nylons (HTN) in that PPAs comprise aromatic repeating units in an amount greater than or equal to 55 weight percent. The glass transitions temperature and the melting point are indicative of the aromatic content of the PPA.

Reinforced PPA has better hydrolytic stability than reinforced PA66. However, it was surprising that reinforced PPE/PPA blends as described herein have better hydrolytic stability than reinforced PPA.

In some embodiments the compositions described herein can be substantially free of added aliphatic polyamides. Substantially free of added aliphatic polyamide is defined as containing less than or equal to 2 weight percent, or, more specifically less than or equal to 1 weight percent, or, more specifically, less than or equal to 0.5 weight percent of an added aliphatic polyamide, based on the total weight of the composition. An added liphatic polyamides is defined as an aliphatic polyamide added in addition to the polyphthalamide. It is understood that polyphthalamides may contain residual aliphatic polyamides resulting from synthesis of the polyphthalamide. Aliphatic polyamides are distinguished from polyphthalamides in that aliphatic polyamides have no repeating units that comprise aromatic moieties. Aliphatic polyamides include both homopolymers and copolymers.

Polyphthalamides comprise repeating units having formula (I)

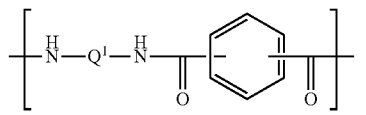

wherein $Q^1$ is independently at each occurrence a branched or unbranched alicyclic alkyl group having 4 to 8 carbons. In some embodiments, $Q^1$ is independently at each occurrence a 1,6-hexyl group. Polyamide resins, in general characterized by the presence of an amide group (—C(O)NH—) which is the condensation product of a carboxylic acid and an amine. Polyphthalaimdes are the condensation product of terephthalic acid and an amine, isophthalic acid and an amine or a combination of terephthalic acid, isophthalic acid and an amine. When employing more than one diamine the ratio of the diamines can affect some of the physical properties of the resulting polymer such as the melt temperature. When employing more than one acid, the ratio of the acids can affect some of the physical properties of the resulting polymer as well. The ratio of diamine to dicarboxylic acid is typically equimolar although excesses of one or the other may be used to determine the end group functionality. In addition the reaction can further include monoamines and monocarboxylic acids which function as chain stoppers and determine, at least in part, the end group functionality. In some embodiments it is preferable to have an amine end group content of greater than or equal to about 30 milliequivalents per gram (meq/g), or, more specifically, greater than or equal to about 40 meq/g.

In some embodiments the polyphthalamide is a block copolymer or a random copolymer comprising the units of formula (I) and units of formula (II)

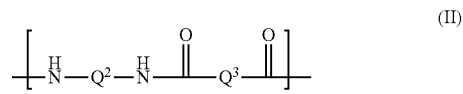

wherein $Q^2$ and $Q^3$ are independently at each occurrence a branched or unbranched alicyclic alkyl group having 4 to 12 carbons. $Q^2$ and $Q^3$ can be the same or different alicyclic alkyl group.

The polythalamide has a glass transition temperature (Tg) greater than or equal to 80° C., or, greater than or equal to 100° C., or, greater than or equal to 120° C. The polythalamide also has melting temperature (Tm) of 290 to 330° C. Within this range the Tm may be greater than or equal to 300° C. Also within this range the Tm may be less than or equal to 325° C.

The polyphthalamide is present in an amount of 30 to 70 weight percent based on the total weight of the composition. Within this range the amount of polyphthalamide can be greater than or equal to 35 weight percent, or, more specifically, greater than or equal to 40 weight percent. Also within this range the amount of polyphthalamide can be less than or equal to 60 weight percent, or, more specifically, less than or equal to 55 weight percent.

In addition to polyphthalamide, the composition comprises a poly(phenylene ether). Poly(phenylene ether) comprises repeating structural units of formula (III)

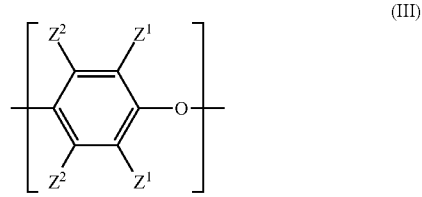

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(phenylene ether) can comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(phenylene ether) can be in the form of a homopolymer; a copolymer; a graft copolymer; an ionomer; or a block copolymer; as well as combinations comprising two or more of the foregoing polymers. Poly(phenylene ether) includes polyphenylene ether comprising 2,6-dimethyl-1,4-phenylene ether units optionally in combination with 2,3,6-trimethyl-1,4-phenylene ether units.

The poly(phenylene ether) can be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

A portion of the poly(phenylene ether) can be functionalized with a polyfunctional compound (functionalizing agent) as described below. The poly(phenylene ether) can be functionalized prior to making the composition or can be functionalized as part of making the composition. Furthermore, prior to functionalization the poly(phenylene ether) can be extruded, for example to be formed into pellets. It is also possible for the poly(phenylene ether) to be melt mixed with other additives that do not interfere with functionalization. Exemplary additives of this type include s, flow promoters, and the like.

In some embodiments the poly(phenylene ether) can comprise 0.1 weight percent weight percent to 90 weight percent of structural units derived from a functionalizing agent, based on the total weight of the poly(phenylene ether). Within this range, the poly(phenylene ether) can comprise less than or equal to 80 weight percent, or, more specifically, less than or equal to 70 weight percent of structural units derived from functionalizing agent, based on the total weight of the poly(phenylene ether).

The poly(phenylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(phenylene ether) or combination of poly(phenylene ether)s has an initial intrinsic viscosity of 0.1 to 0.60 deciliters per gram (dl/g), as measured in chloroform at 25° C. Initial intrinsic viscosity is defined as the intrinsic viscosity of the poly(phenylene ether) prior to melt mixing with the other components of the composition and final intrinsic viscosity is defined as the intrinsic viscosity of the poly(phenylene ether) after melt mixing with the other components of the composition. As understood by one of ordinary skill in the art the viscosity of the poly(phenylene ether) may be up to 30% higher after melt mixing. The percentage of increase can be calculated by (final intrinsic viscosity−initial intrinsic viscosity)/initial intrinsic viscosity. Determining an exact ratio, when two initial intrinsic viscosities are used, will depend somewhat on the exact intrinsic viscosities of the poly(phenylene ether) used and the ultimate physical properties that are desired.

The poly(phenylene ether) is present in an amount of 10 to 30 weight percent based on the total weight of the composition. Within this range the poly(phenylene ether) may be present in an amount greater than or equal to 15 weight percent, or, more specifically, greater than or equal to 18 weight percent. Also within this range the poly(phenylene ether) can be present in an amount of less than or equal to 25 weight percent, or, more specifically, less than or equal to 20 weight percent.

The compatibilized polyphthalamide/poly(phenylene ether) blend is formed using a functionalizing agent. When used herein, the expression "functionalizing agent" refers to polyfunctional compounds which interact with the poly(phenylene ether), the polyamide resin, or both. This interaction may be chemical (e.g., grafting) and/or physical (e.g., affecting the surface characteristics of the dispersed phases). In either instance the resulting compatibilized polyphthalamide/poly(phenylene ether) composition appears to exhibit improved compatibility, particularly as evidenced by enhanced impact strength, mold knit line strength and/or elongation. As used herein, the expression "compatibilized polyphthalamide/poly(phenylene ether) blend" refers to those compositions which have been physically and/or chemically compatibilized with a functionalizing agent.

The functionalizing agent comprises a polyfunctional compound that is one of two types. The first type has in the molecule both (a) a carbon-carbon double bond and (b) at least one carboxylic acid, anhydride, epoxy, imide, amide, ester group or functional equivalent thereof. Examples of such polyfunctional compounds include maleic acid; maleic anhydride; fumaric acid; maleic hydrazide; dichloro maleic anhydride; and unsaturated dicarboxylic acids (e.g. acrylic acid, butenoic acid, methacrylic acid, t-ethylacrylic acid, pentenoic acid). In some embodiments, the functionalizing agent comprises maleic anhydride and/or fumaric acid.

The second type of polyfunctional functionalizing agent compounds are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and salts thereof. Typical of this type of functionalizing agents are the aliphatic polycarboxylic acids, acid esters and acid amides represented by the formula (IV):

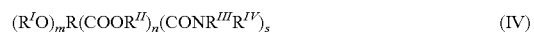

$$(R^{I}O)_{m}R(COOR^{II})_{n}(CONR^{III}R^{IV})_{s} \qquad (IV)$$

wherein R is a linear or branched chain saturated aliphatic hydrocarbon having 2 to 20, or, more specifically, 2 to 10 carbon atoms; $R^{I}$ is hydrogen or an alkyl, aryl, acyl or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or more specifically 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein (OR$^I$) is alpha or beta to a carbonyl group and at least two carbonyl groups are separated by 2 to 6 carbon atoms. Obviously, R$^I$, R$^{II}$, R$^{III}$ and R$^{IV}$ cannot be aryl when the respective substituent has less than 6 carbon atoms.

Suitable polycarboxylic acids include, for example, citric acid, malic acid, agaricic acid; including the various commercial forms thereof, such as for example, the anhydrous and hydrated acids; and combinations comprising one or more of the foregoing. In some embodiments, the functionalizing agent comprises citric acid. Illustrative of esters useful herein include, for example, acetyl citrate and mono- and/or distearyl citrates and the like. Suitable amides useful herein include, for example, N,N'-diethyl citric acid amide; N-phenyl citric acid amide; N-dodecyl citric acid amide; N,N'-didodecyl citric acid amide and N-dodecyl malic acid. Derivates include the salts thereof, including the salts with amines and the alkali and alkaline metal salts. Exemplary suitable salts include calcium malate, calcium citrate, potassium malate, and potassium citrate.

The foregoing functionalizing agents may be added directly to the melt blend or pre-reacted with either or both the poly(phenylene ether) and polyamide. In some embodiments, at least a portion of the functionalizing agent is pre-reacted, either in the melt or in a solution of a suitable solvent, with all or a part of the poly(phenylene ether). It is believed that such pre-reacting may cause the functionalizing agent to react with the polymer and, consequently, functionalize the poly(phenylene ether). For example, the poly(phenylene ether) may be pre-reacted with maleic anhydride, fumaric acid and/or citric acid to form an anhydride and/or acid functionalized poly(phenylene ether) which has improved compatibility with the polyamide compared to a non-functionalized poly(phenylene ether).

The amount of the functionalizing agent used will be dependent upon the specific functionalizing agent chosen and the specific polymeric system to which it is added.

In some embodiments, the functionalizing agent is employed in an amount of 0.05 to 2.0 weight percent, based on the total weight of the composition. Within this range the amount of functionalizing agent may be greater than or equal to 0.1, or, more specifically, greater than or equal to 0.2, or, more specifically, greater than or equal to 0.5 weight percent. Also within this range the amount of functionalizing agent may be less than or equal to 1.75, or, more specifically, less than or equal to 1.5 weight percent, or, more specifically less than or equal to 0.9 weight percent.

The composition comprises a nylon glass fiber. A nylon glass fiber is defined as a glass fiber surface treated with silanes to improve adhesion and dispersion with polyamide as are commonly known in the art. The glass fiber may have an average length of 2.8 to 3.6 millimeters. The glass fiber may have an average diameter of 8 to 16 micrometers.

The nylon glass fiber is incorporated in an amount of 20 to 45 weight percent based on the total weight of the composition. Within this range the amount of reinforcing filler can be greater than or equal to 25 weight percent, or, more specifically, greater than or equal to 28 weight percent. Also within this range the amount of reinforcing filler can be less than or equal to 40, or, more specifically, less than or equal to 37 weight percent.

The composition can, optionally, further comprise one or more other additives known in the thermoplastics arts. Useful additives include, for example, stabilizers, mold release agents, processing aids, drip retardants, nucleating agents, dyes, pigments, colorants, crystallization nucleators, metal salts, antioxidants, anti-static agents, plasticizers, lubricants, blowing agents, metal deactivators, antiblocking agents, nanoclays, fragrances (including fragrance-encapsulated polymers), and the like, and combinations thereof. Additives can be added in amounts that do not unacceptably detract from the desired performance and physical properties of the composition. Such amounts can be determined by a skilled artisan without undue experimentation. Generally, the total amount of additives will be less than or equal to 5 weight percent based on the total weight of the composition.

In one embodiment, the composition comprises a black pigment. In one embodiment the black pigment comprises carbon black in an amount up to 0.5 weight percent, based on the total weight of the composition.

The composition can, optionally, exclude any polymer other than those taught herein as required.

Specific embodiments of the compositions are shown in Table 1.

TABLE 1

| | Embodiment A | Embodiment B | Embodiment C |
|---|---|---|---|
| PPE (as described in Table 2) | 19.00 | 19.00 | 24.00 |
| Citric Acid | 0.49 | 0.49 | 0.49 |
| Carbon black | 0.2 | 0.2 | 0.2 |
| Antioxidant | 0.3 | 0.3 | 0.3 |
| Potassium Iodide solution, 33% | 0.2 | 0.2 | 0.2 |
| Cuprous Iodide | 0.01 | 0.01 | 0.01 |
| PPA (as described in Table 2) | 45.00 | 50.00 | 45.00 |
| Glass fiber (as described in Table 2) | 35.00 | 30.00 | 30.00 |

The composition can be prepared using various techniques, including batch or continuous techniques that employ kneaders, extruders, mixers, and the like. For example, the composition can be formed as a melt blend employing a twin-screw extruder. In some embodiments at least some of the components are added sequentially. For example, the poly(phenylene ether) and functionalizing agent may be added to the extruder at the feed throat or in feeding sections adjacent to the feed throat, while the polyphthalamide may be added to the extruder in a subsequent feeding section downstream. When a functionalized poly(phenylene ether) is used the functionalized poly(phenylene ether) may be added to the extruder at the feed throat or in feeding sections adjacent to the feed throat, while the polyphthalamide may be added to the extruder in a subsequent feeding section downstream. A vacuum system may be applied to the extruder, prior to the second sequential addition, to generate a sufficient vacuum to lower the residual levels of non-reacted functionalizing agent and any other volatile materials. In an alternative embodiment, the sequential addition of the components may be accomplished through multiple extrusions. A composition may be made by preextrusion of selected components, such as the poly(phenylene ether) and the functionalizing agent to produce a pelletized mixture. A second extrusion may then be employed to combine the preextruded components with the remaining components. The extruder may be a two lobe or three lobe twin screw extruder.

The composition can be used to make articles such as engine fluid handling components, engine cooling components such as hoses, pumps, manifolds, turbo outlets, and fluid meters.

Embodiment 1

A reinforced composition comprising 55 to 80 wt % of a compatibilized blend of a polyphthalamide and a poly(phenylene ether) wherein said compatibilized blend is formed from a mixture of polyphthalamide and poly(phenylene ether) in a ratio of between 1.5:1 and 7.0:1, and a functionalizing agent in an amount sufficient to effect compatibilization; and 20 to 45 wt % of a nylon glass fiber, wherein the composition contains less than 0.1 wt % of phosphinates and less than 0.1 wt % of impact modifiers and weight percent is based on the total weight of the composition.

Embodiment 2

The reinforced composition of Embodiment 1, wherein the polyphthalamide is present in an amount of 30 to 70 weight percent and the poly(phenylene ether) is present in an amount of 10 to 30 weight percent, and weight percent is based on the total weight of the composition.

Embodiment 3

The reinforced composition of Embodiment 1 or 2, wherein the polyphthalamide has a melting point greater than 290° C. and a glass transition temperature greater than or equal to 80° C.

Embodiment 4

The reinforced composition of any of Embodiments 1-3, wherein the composition is substantially free of added aliphatic polyamides.

Embodiment 5

The reinforced composition of any of Embodiments 1-4, wherein the glass fiber has an average diameter of 8 to 16 micrometers.

Embodiment 6

The reinforced composition of Embodiments 1-5, wherein the glass fiber has an average length of 2.8 to 3.6 millimeters.

Embodiment 7

The reinforced composition of any of Embodiments 1-6, wherein the poly(phenylene ether) comprises 2,6-dimethyl-1,4-phenylene ether units.

Embodiment 8

The reinforced composition of any of Embodiments 1-7, wherein the polyphthalamide comprises (a) 60-70 mol % of units of formula (I)

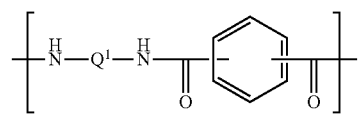

wherein $Q^1$ is a 1,6-hexyl group and the aromatic portion of the repeating unit is derived from terephthalic acid, (b) 20-30 mol % of units of formula (I) wherein $Q^1$ is a 1,6-hexyl group and the aromatic portion of the repeating unit is derived from isophthalic acid, and (c) 5-15 mol % of units of formula (II)

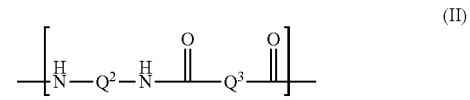

wherein $Q^2$ is a 1,4-butyl group and $Q^3$ is a 1,6-hexyl group.

Embodiment 9

The reinforced composition of any of Embodiments 1-8, wherein the functionalizing agent comprises maleic anhydride, fumaric acid, or citric acid.

Embodiment 10

The reinforced composition of any of Embodiments 1-9, wherein the functionalizing agent is citric acid.

Embodiment 11

The reinforced composition of any of Embodiments 1-10, wherein the citric acid is used in an amount of 0.2 to 0.9 weight percent based on the total weight of the composition.

Embodiment 12

The reinforced composition of any of Embodiments 1-11, further comprising a black pigment.

Embodiment 13

The reinforced composition of Embodiment 12, wherein the black pigment is carbon black and is present in an amount up to 0.5 weight percent, based on the total weight of the composition.

Embodiment 14

A reinforced composition comprising 55 to 80 wt % of a compatibilized blend of a polyphthalamide comprising (a) 60-70 mol % of units of formula (I)

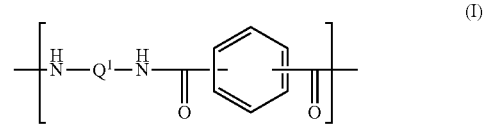

wherein $Q^1$ is a 1,6-hexyl group and the aromatic portion of the repeating unit is derived from terephthalic acid, (b) 20-30 mol % of units of formula (I) wherein $Q^1$ is a 1,6-hexyl group and the aromatic portion of the repeating unit is derived from isophthalic acid, and (c) 5-15 mol % of units of formula (II)

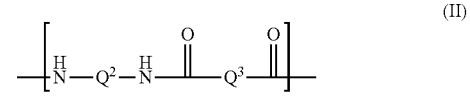

wherein $Q^2$ is a 1,4-butyl group and $Q^3$ is a 1,6-hexyl group, and a poly(phenylene ether) comprising 2,6-dimethyl-1,4-phenylene ether units wherein said compatibilized blend is formed from a mixture of said polyphthalamide and poly (phenylene ether) in a ratio of between 1.5:1 and 7.0:1, and 0.2 to 0.9 weight percent citric acid; and 20 to 45 wt % of a nylon glass fiber, wherein the composition contains less than 0.1 wt % of phosphinates and less than 0.1 wt % of impact modifiers and weight percent is based on the total weight of the composition.

Embodiment 15

The composition of Embodiment 14, wherein the polyphthalamide is present in an amount of 30 to 70 weight percent, the poly(phenylene ether) is present in an amount of 10 to 30 weight percent, and weight percent is based on the total weight of the composition.

Embodiment 16

The reinforced composition of any of Embodiments 14-15, wherein the polyphthalamide has a melting point greater than 290° C. and a glass transition temperature greater than or equal to 80° C.

Embodiment 17

The reinforced composition of any of Embodiments 14-16, wherein the composition is substantially free of added aliphatic polyamides.

Embodiment 18

The reinforced composition of any of Embodiments 14-17, wherein the glass fiber has an average diameter of 8 to 16 micrometers.

Embodiment 19

The reinforced composition of any of Embodiments 14-18, wherein the glass fiber has an average length of 2.8 to 3.6 millimeters.

Embodiment 20

The reinforced composition of any of Embodiments 14-19, further comprising a black pigment.

Embodiment 21

The reinforced composition of Embodiment 20, wherein the black pigment is carbon black and is present in an amount up to 0.5 weight percent, based on the total weight of the composition.

Embodiment 22

An article comprises a reinforced composition comprising 55 to 75 wt % of a compatibilized blend of a polyphthalamide and a poly(phenylene ether) wherein said compatibilized blend is formed from a mixture of polyphthalamide and poly (phenylene ether) in a ratio of between 1.5:1 and 7.0:1, and a functionalizing agent in an amount sufficient to effect compatibilization; and 20 to 45 wt % of a nylon glass fiber, wherein the composition contains less than 0.1 wt % of phosphinates and less than 0.1 wt % of impact modifiers and weight percent is based on the total weight of the composition.

Embodiment 23

The article of Embodiment 22, wherein the polyphthalamide is present in an amount of 30 to 70 weight percent and the poly(phenylene ether) is present in an amount of 10 to 30 weight percent, and weight percent is based on the total weight of the composition.

Embodiment 24

The article of any of Embodiments 22-23, wherein the polyphthalamide has a melting point greater than 290° C. and a glass transition temperature greater than or equal to 80° C.

Embodiment 25

The article of any of Embodiments 22-24, wherein the composition is substantially free of added aliphatic polyamides.

Embodiment 26

The article of any of Embodiments 22-25, wherein the glass fiber has an average diameter of 8 to 16 micrometers.

Embodiment 27

The article of any of Embodiments 22-26, wherein the glass fiber has an average length of 2.8 to 3.6 millimeters.

Embodiment 28

The article of any of Embodiments 22-27, wherein the poly(phenylene ether) comprises 2,6-dimethyl-1,4-phenylene ether units.

Embodiment 29

The article of any of Embodiments 22-28, wherein the polyphthalamide comprises (a) 60-70 mol % of units of formula (I)

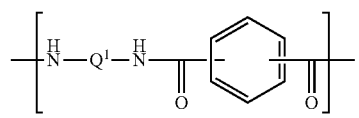

wherein $Q^1$ is a 1,6-hexyl group and the aromatic portion of the repeating unit is derived from terephthalic acid, (b) 20-30 mol % of units of formula (I) wherein $Q^1$ is a 1,6-hexyl group and the aromatic portion of the repeating unit is derived from isophthalic acid, and (c) 5-15 mol % of units of formula (II)

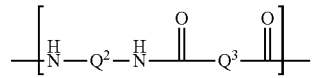

wherein $Q^2$ is a 1,4-butyl group and $Q^3$ is a 1,6-hexyl group.

Embodiment 30

The article of any of Embodiments 22-29, wherein the functionalizing agent comprises maleic anhydride, fumaric acid, or citric acid.

Embodiment 31

The article of any of Embodiments 22-30, wherein the functionalizing agent is citric acid.

Embodiment 32

The article of any of Embodiments 22-31, wherein the citiric acid is used in an amount of 0.2 to 0.9 weight percent based on the total weight of the composition.

Embodiment 33

The article of any of Embodiments 22-32, wherein the composition further comprises a black pigment.

Embodiment 34

The article of Embodiment 33, wherein the black pigment is carbon black and is present in an amount up to 0.5 weight percent based on the total weight of the composition.

Embodiment 35

The article of any of Embodiments 22-34, wherein the article is selected from the group consisting of engine cooling components, engine fluid handling components, hoses, pumps, manifolds, turbo outlets, and fluid meters.

Embodiment 36

An article comprises 55 to 80 weight percent (wt %) of a compatibilized blend of a polyphthalamide comprising (a) 60-70 mol % of units of formula (I)

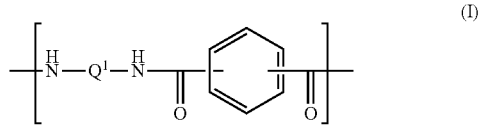

wherein $Q^1$ is a 1,6-hexyl group and the aromatic portion of the repeating unit is derived from terephthalic acid, (b) 20-30 mol % of units of formula (I) wherein $Q^1$ is a 1,6-hexyl group and the aromatic portion of the repeating unit is derived from isophthalic acid, and (c) 5-15 mol % of units of formula (II)

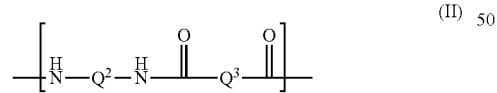

wherein $Q^2$ is a 1,4-butyl group and $Q^3$ is a 1,6-hexyl group, and a poly(phenylene ether) comprising 2,6-dimethyl-1,4-phenylene ether units wherein said compatibilized blend is formed from a mixture of said polyphthalamide and poly (phenylene ether) in a ratio of between 1.5:1 and 7.0:1, and 0.2 to 0.9 weight percent citric acid; and 20 to 45 wt % of a nylon glass fiber, wherein the composition contains less than 0.1 wt % of phosphinates and less than 0.1 wt % of impact modifiers and weight percent is based on the total weight of the composition.

Embodiment 37

The article of Embodiment 36, wherein the polyphthalamide is present in an amount of 30 to 70 weight percent, the poly(phenylene ether) is present in an amount of 10 to 30 weight percent, and weight percent is based on the total weight of the composition.

Embodiment 38

The article of any of Embodiments 36-37, wherein the polyphthalamide has a melting point greater than 290° C. and a glass transition temperature greater than or equal to 80° C.

Embodiment 39

The article of any of Embodiments 36-38, wherein the composition is substantially free of added aliphatic polyamides.

Embodiment 40

The article of any of Embodiments 36-39, wherein the glass fiber has an average diameter of 8 to 16 micrometers.

Embodiment 41

The article of any of Embodiments 36-40, wherein the glass fiber has an average length of 2.8 to 3.6 millimeters.

Embodiment 42

The article of any of Embodiments 36-41, wherein the composition further comprises a black pigment.

Embodiment 43

The article of Embodiment 42, wherein the black pigment is carbon black and is present in an amount up to 0.5 weight percent, based on the total weight of the composition.

Embodiment 44

The article of any of Embodiments 36-43, wherein the article wherein is selected from the group consisting of engine cooling components, engine fluid handling components, hoses, pumps, manifolds, turbo outlets, and fluid meters

EXAMPLES

The examples used the materials described in Table 2 and in the following paragraphs.

TABLE 2

| Component | Grade | Supplier | Description |
|---|---|---|---|
| PPE | PPO ® (0.40IV) | Sabic Innovative Plastics, US LLC | Poly(2,6-dimethyl-1,4-phenylene)ether with an intrinsic viscosity of 0.40 dl/g. |

TABLE 2-continued

| Component | Grade | Supplier | Description |
|---|---|---|---|
| Citric Acid | Citric Acid | International Chemical Incorporated | Citric Acid - functionalizing agent |
| Anti-oxidant | Irganox 1010 | Great Lakes Chemcial Corporation | Heat Stabilizer |
| Liquid potassium iodide | Liquid KI | Ajay North America Incorporated | Heat Stabilizer |
| Cuprous Iodide | Cuprous Iodide | Ajay North America Incorporated | Heat Stabilizer |
| PA 6/6 | Vydyne 21Z | Ascend Inc. | Polyamide 6/6 |
| PA 6/6 ground | Vydyne 21Z | | Ground version of PA 6/6; all particles passed through a 20 mesh screen |
| Polyphthalamide | Amodel A-1006C | Solvay Advanced Polymers | Semi-aromatic nylon |
| Polyphthalamide ground | Amodel A-1006C | | Ground version of polyphthalamide, all particles passed through a 20 mesh screen |
| Glass Fibers | ChopVantage ® HP 3540 | PPG | Chopped glass fibers with average length of 3.2 millimeters and an average diameter of 10 micrometers |

Polyphthalamide, Amodel A-1006C, is a copolymer comprising three different repeating units in the following amounts: (a) 60-70 mol % of units of formula (I) wherein $Q^1$ is a 1,6-hexyl group and the aromatic portion of the repeating unit is derived from terephthalic acid, (b) 20-30 mol % of units of formula (I) wherein $Q^1$ is a 1,6-hexyl group and the aromatic portion of the repeating unit is derived from isophthalic acid, and (c) 5-15 mol % of units of formula (II) wherein $Q^2$ is a 1,4-butyl group and $Q^3$ is a 1,6-hexyl group. The amounts and structure of the repeating units was determined using nuclear magnetic resonance spectroscopy.

The Examples also contained 0.7 weight percent of a combination of additives (Irganox 1010, potassium iodide, copper iodide, and carbon black).

The examples were made by melt blending the poly(phenylene ether), citric acid, additives, polyphthalamide or polyamide to form a first melt mixture and melt mixing the masterbatch and glass fibers with the first melt mixture in a 30 millimeter Werner Pfleider twin screw extruder. The extruder for the polyamide 66 examples was set with barrel temperatures of 249-288° C. and a die temperature of 288° C., with the screw rotating at 240 rotations per minute (rpm) and a rate of about 18 kilograms per hour. The extruder for the polyphthalamide examples was set with barrel temperatures of 260-307° C. and a die temperature of 343° C., with the screw rotating at 240 rotations per minute (rpm) and a rate of about 18 kilograms per hour. The amounts of the components of the compositions are shown in Table 3. Amounts are in weight percent based on the total weight of the compositions.

TABLE 3

|  | 1* | 2* | *3 | 4* | 5 | 6 |
|---|---|---|---|---|---|---|
| PPE | — | 10 | 20 | — | 10 | 20 |
| CA | — | 0.7 | 0.7 | — | 0.7 | 0.7 |
| PA 6/6 ground | 5 | — | — | — | — | — |
| Polyphthalamide ground | — | — | — | 5 | — | — |
| Pol hthalamide | — | — | — | 60 | 55 | 45 |
| PA 6/6 | 60 | 55 | 45 | — | — | — |
| Glass Fibers | 35 | 35 | 35 | 35 | 35 | 35 |

*Comparative Example

The compositions were molded and tested. Testing methods are shown in Table 4. The compositions were tested after three time period/condition combinations—after molding, after immersion in 23 C water for 13 and 31 days. The change is physical properties after immersion in 23 C water is shown in Table 5.

TABLE 4

| Test Name | Method |
|---|---|
| Notched Izod | ISO 180 |
| Dynatup total energy | ASTM D3763 |
| Chord Modulus | ISO 527 |
| Stress @ Break | ISO 527 |
| Strain @ Break | ISO 527 |

TABLE 5

|  | 1* | 2* | *3 | 4* | 5 | 6 |
|---|---|---|---|---|---|---|
| Moisture content (%) | | | | | | |
| 0 days immersion | 0.1 | 0.1 | 0.1 | 0.1 | 0.1 | 0.1 |
| 13 days immersion | 1.6 | 1.3 | 1.2 | 0.6 | 0.6 | 0.5 |
| 30 days immersion | 2.5 | 2.1 | 1.9 | 0.8 | 0.9 | 0.9 |
| Notched Izod @ 23 C. (kJ/m²) | | | | | | |
| 0 days immersion | 9.6 | 9.4 | 9.5 | 8.5 | 8.1 | 7.0 |
| 13 days immersion | 11.6 | 10.5 | 10.5 | 8.1 | 7.8 | 7.4 |
| 30 days immersion | 13.2 | 11.8 | 11.8 | 7.6 | 7.8 | 7.3 |
| Dynatup (J) | | | | | | |
| 0 days immersion | 8.9 | 9.0 | 9.1 | 7.9 | 9.8 | 9.8 |
| 13 days immersion | 15.2 | 12.5 | 14.1 | 8.4 | 10.6 | 10.1 |
| 30 days immersion | 21.7 | 20.2 | 15.8 | 8.5 | 10.6 | 11.8 |

TABLE 5-continued

|  | 1* | 2* | *3 | 4* | 5 | 6 |
|---|---|---|---|---|---|---|
| Chord Modulus (MPa) | | | | | | |
| 0 days immersion | 11784 | 11776 | 11854 | 12718 | 12344 | 12228 |
| 13 days immersion | 9188 | 8966 | 9126 | 12600 | 12827 | 12160 |
| 30 days immersion | 8372 | 8044 | 8343 | 12793 | 12620 | 12143 |
| Stress @ Break (MPa) | | | | | | |
| 0 days immersion | 191 | 185 | 182 | 182 | 186 | 187 |
| 13 days immersion | 139 | 133 | 139 | 170 | 190 | 175 |
| 30 days immersion | 127 | 121 | 128 | 169 | 184 | 170 |
| Strain @ Break (%) | | | | | | |
| 0 days immersion | 2.6 | 2.4 | 2.4 | 1.7 | 1.9 | 2.1 |
| 13 days immersion | 2.8 | 2.5 | 3.3 | 1.6 | 2.0 | 2.0 |
| 30 days immersion | 3.0 | 2.6 | 3.6 | 1.6 | 2.0 | 2.0 |

*Comparative example

The reinforced PPE/PPA examples (Examples 5 & 6) showed remarkable retention of stress @ break after immersion in water, especially when compared to reinforced PPA (Example 4), reinforced PA 6/6 (Example 1), and reinforced PPE/PA66 (Examples 2 & 3)

The compositions were also tested for stress@break both initially and after immersion in 80° C. water for 20 weeks. Results (in MPa) are shown in Table 6.

TABLE 6

|  | Ex. 3* | % retention | Ex. 4* | % retention | Ex. 6 | % retention |
|---|---|---|---|---|---|---|
| Initial | 155 | | 187 | | 172 | |
| 1 week | 105 | 68 | 162 | 87 | 144 | 84 |
| 4 weeks | 100 | 65 | 133 | 71 | 134 | 78 |
| 8 weeks | 90 | 58 | 116 | 62 | 135 | 78 |
| 16 weeks | 84 | 54 | 114 | 61 | 133 | 77 |
| 20 weeks | 79 | 51 | 109 | 58 | 124 | 72 |

*Comparative example

The reinforced PPE/PPA composition (Example 6) showed much better retention of tensile strength compared to the reinforced PPE/PA 66 (Example 3) and reinforced PPA (example 4).

Examples 7-11 were made as described above. The compositions are shown in Table 7. Similar to Examples 1-6 the Examples also contained 0.7 weight percent of a combination of additives (Irganox 1010, potassium iodide, copper iodide, and carbon black).

TABLE 7

|  | Ex. 7* | Ex. 8* | Ex. 9 | Ex. 10 | Ex. 11 |
|---|---|---|---|---|---|
| PPE | — | — | 19.00 | 19.00 | 24.00 |
| CA | — | — | 0.49 | 0.49 | 0.49 |
| Polyphthalamide ground | 5.00 | 5.00 | — | — | — |
| Polyphthalamide | 59.49 | 64.49 | 45.00 | 50.00 | 45.00 |
| Glass Fibers | 35.00 | 30.00 | 35.00 | 30.00 | 30.00 |

*Comparative Example

The compositions were molded and tested for notched Izod (see Table 4 for the testing method). The compositions were tested after molding and after exposure to heat aging for the time periods shown in Table 8.

TABLE 8

| Aging Temp (degree C.) | Aging time (hr) | Ex. 7* | % retention | Ex. 8* | % retention | Ex. 9 | % retention | Ex. 10 | % retention | Ex. 11 | % retention |
|---|---|---|---|---|---|---|---|---|---|---|---|
| Initial | Initial | 9.0 | — | 8.4 | | 9.7 | | 8.3 | | 8.7 | |
| 190 | 250 | 8.9 | 99 | 8.5 | 101 | 9.9 | 103 | 8.7 | 104 | 8.8 | 102 |
| 190 | 500 | 9.2 | 102 | 8.5 | 101 | 9.7 | 101 | 8.5 | 102 | 8.8 | 101 |
| 210 | 250 | 9.2 | 102 | 8.4 | 100 | 9.7 | 100 | 8.4 | 101 | 8.5 | 98 |
| 210 | 500 | 9.1 | 101 | 8.4 | 101 | 10.0 | 103 | 8.4 | 101 | 8.3 | 96 |
| 230 | 250 | 8.8 | 98 | 8.1 | 97 | 9.9 | 103 | 8.4 | 101 | 8.7 | 100 |
| 230 | 500 | 8.8 | 98 | 8.0 | 95 | 9.5 | 99 | 8.1 | 98 | 8.3 | 95 |
| 250 | 250 | 7.9 | 88 | 7.9 | 95 | 9.4 | 97 | 8.3 | 100 | 8.3 | 95 |
| 250 | 500 | 5.8 | 64 | 5.2 | 62 | 9.6 | 99 | 8.2 | 99 | 8.0 | 92 |

*Comparative Example

As can be seen from the extended aging at high temperatures, Examples 9-11 retain much more notched Izod impact strength than the comparative Examples 7-8.

In the specification and the claims, reference is made to a number of terms, which shall be defined to have the following meanings. The terms "first," "second," and the like, "primary," "secondary," and the like, "(a)," "(b)" and the like, as used herein do not denote any order, quantity, or importance, but rather are used to distinguish one element from another. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments. The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents and published articles cited herein are incorporated herein by reference.

The invention claimed is:

1. A reinforced composition comprising:
55 to 80 wt % of a compatibilized blend of a polyphthalamide and a poly(phenylene ether) wherein said compatibilized blend is formed from a mixture of polyphthalamide and poly(phenylene ether) in a ratio of between 1.5:1 and 7.0:1, and a functionalizing agent in an amount sufficient to effect compatibilization; and
20 to 45 wt % of a nylon glass fiber,
wherein the composition contains less than 0.1 wt % of phosphinates and less than 0.1 wt % of impact modifiers and weight percent is based on the total weight of the composition.

2. The reinforced composition of claim 1, wherein the polyphthalamide is present in an amount of 30 to 70 weight percent and the poly(phenylene ether) is present in an amount of 10 to 30 weight percent, and weight percent is based on the total weight of the composition.

3. The reinforced composition of claim 1, wherein the polyphthalamide has a melting point greater than 290° C. and a glass transition temperature greater than or equal to 80° C.

4. The reinforced composition of claim 1, wherein the composition is substantially free of added aliphatic polyamides.

5. The reinforced composition of claim 1, wherein the glass fiber has an average diameter of 8 to 16 micrometers.

6. The reinforced composition of claim 1, wherein the glass fiber has an average length of 2.8 to 3.6 millimeters.

7. The reinforced composition of claim 1, wherein the poly(phenylene ether) comprises 2,6-dimethyl-1,4-phenylene ether units.

8. The reinforced composition of claim 1, wherein the polyphthalamide comprises (a) 60-70 mol % of units of formula (I)

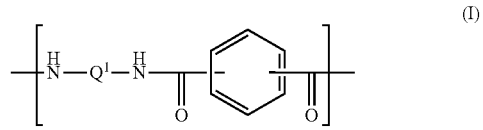

wherein $Q^1$ is a 1,6-hexyl group and the aromatic portion of the repeating unit is derived from terephthalic acid, (b) 20-30 mol % of units of formula (I) wherein $Q^1$ is a 1,6-hexyl group and the aromatic portion of the repeating unit is derived from isophthalic acid, and (c) 5-15 mol % of units of formula (II)

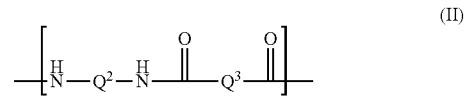

wherein $Q^2$ is a 1,4-butyl group and $Q^3$ is a 1,6-hexyl group.

9. The reinforced composition of claim 1, wherein the functionalizing agent comprises maleic anhydride, fumaric acid, or citric acid.

10. The reinforced composition of claim 1, wherein the functionalizing agent is citric acid.

11. The reinforced composition of claim 1, wherein the citric acid is used in an amount of 0.2 to 0.9 weight percent based on the total weight of the composition.

12. The reinforced composition of claim 1, further comprising a black pigment.

13. The reinforced composition of claim 12, wherein the black pigment is carbon black and is present in an amount up to 0.5 weight percent, based on the total weight of the composition.

14. A reinforced composition comprising
55 to 80 wt % of a compatibilized blend of a polyphthalamide comprising (a) 60-70 mol % of units of formula (I)

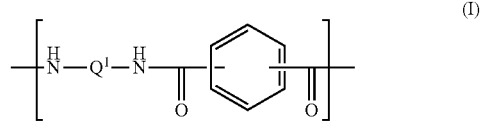

wherein $Q^1$ is a 1,6-hexyl group and the aromatic portion of the repeating unit is derived from terephthalic acid, (b) 20-30 mol % of units of formula (I) wherein $Q^1$ is a 1,6-hexyl group and the aromatic portion of the repeating unit is derived from isophthalic acid, and (c) 5-15 mol % of units of formula (II)

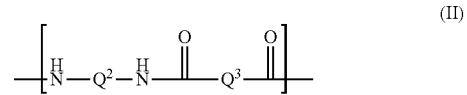

wherein $Q^2$ is a 1,4-butyl group and $Q^3$ is a 1,6-hexyl group, and a poly(phenylene ether) comprising 2,6-dimethyl-1,4-phenylene ether units wherein said compatibilized blend is formed from a mixture of said polyphthalamide and poly(phenylene ether) in a ratio of between 1.5:1 and 7.0:1, and 0.2 to 0.9 weight percent citric acid; and 20 to 45 wt % of a nylon glass fiber, wherein the composition contains less than 0.1 wt % of phosphinates and less than 0.1 wt % of impact modifiers and weight percent is based on the total weight of the composition.

15. The composition of claim 14, wherein the polyphthalamide is present in an amount of 30 to 70 weight percent, the poly(phenylene ether) is present in an amount of 10 to 30 weight percent, and weight percent is based on the total weight of the composition.

16. The reinforced composition of claim 14, wherein the polyphthalamide has a melting point greater than 290° C. and a glass transition temperature greater than or equal to 80° C.

17. The reinforced composition of claim 14, wherein the composition is substantially free of added aliphatic polyamides.

18. The reinforced composition of claim 14, wherein the glass fiber has an average diameter of 8 to 16 micrometers.

19. The reinforced composition of claim 14, wherein the glass fiber has an average length of 2.8 to 3.6 millimeters.

20. The reinforced composition of claim 14, further comprising a black pigment.

21. The reinforced composition of claim 20, wherein the black pigment is carbon black and is present in an amount up to 0.5 weight percent, based on the total weight of the composition.

22. An article comprises a reinforced composition comprising
   55 to 75 wt % of a compatibilized blend of a polyphthalamide and a poly(phenylene ether) wherein said compatibilized blend is formed from a mixture of polyphthalamide and poly(phenylene ether) in a ratio of between 1.5:1 and 7.0:1, and a functionalizing agent in an amount sufficient to effect compatibilization; and
   20 to 45 wt % of a nylon glass fiber, wherein the composition contains less than 0.1 wt % of phosphinates and less than 0.1 wt % of impact modifiers and weight percent is based on the total weight of the composition.

23. The article of claim 22, wherein the polyphthalamide is present in an amount of 30 to 70 weight percent and the poly(phenylene ether) is present in an amount of 10 to 30 weight percent, and weight percent is based on the total weight of the composition.

24. The article of claim 22, wherein the polyphthalamide has a melting point greater than 290° C. and a glass transition temperature greater than or equal to 80° C.

25. The article of claim 22, wherein the composition is substantially free of added aliphatic polyamides.

26. The article of claim 22, wherein the glass fiber has an average diameter of 8 to 16 micrometers.

27. The article of claim 22, wherein the glass fiber has an average length of 2.8 to 3.6 millimeters.

28. The article of claim 22, wherein the poly(phenylene ether) comprises 2,6-dimethyl-1,4-phenylene ether units.

29. The article of claim 22, wherein the polyphthalamide comprises (a) 60-70 mol % of units of formula (I)

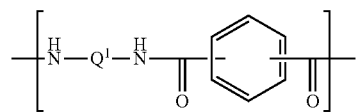

(I)

wherein $Q^1$ is a 1,6-hexyl group and the aromatic portion of the repeating unit is derived from terephthalic acid, (b) 20-30 mol % of units of formula (I) wherein $Q^1$ is a 1,6-hexyl group and the aromatic portion of the repeating unit is derived from isophthalic acid, and (c) 5-15 mol % of units of formula (II)

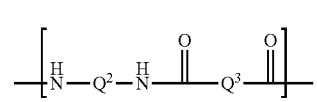

(II)

wherein $Q^2$ is a 1,4-butyl group and $Q^3$ is a 1,6-hexyl group.

30. The article of claim 22, wherein the functionalizing agent comprises maleic anhydride, fumaric acid, or citric acid.

31. The article of claim 22, wherein the functionalizing agent is citric acid.

32. The article of claim 22, wherein the citiric acid is used in an amount of 0.2 to 0.9 weight percent based on the total weight of the composition.

33. The article of claim 22, wherein the composition further comprises a black pigment.

34. The article of claim 33, wherein the black pigment is carbon black and is present in an amount up to 0.5 weight percent based on the total weight of the composition.

35. The article of claim 22, wherein the article is selected from the group consisting of engine cooling components, engine fluid handling components, hoses, pumps, manifolds, turbo outlets, and fluid meters.

36. An article comprises 55 to 80 weight percent (wt %) of a compatibilized blend of a polyphthalamide comprising (a) 60-70 mol % of units of formula (I)

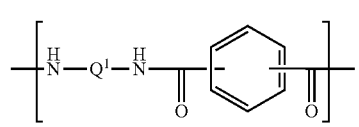

(I)

wherein $Q^1$ is a 1,6-hexyl group and the aromatic portion of the repeating unit is derived from terephthalic acid, (b) 20-30 mol % of units of formula (I) wherein $Q^1$ is a 1,6-hexyl group and the aromatic portion of the repeating unit is derived from isophthalic acid, and (c) 5-15 mol % of units of formula (II)

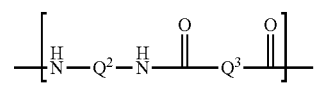

(II)

wherein $Q^2$ is a 1,4-butyl group and $Q^3$ is a 1,6-hexyl group, and a poly(phenylene ether) comprising 2,6-dimethyl-1,4-phenylene ether units wherein said compatibilized blend is formed from a mixture of said polyphthalamide and poly(phenylene ether) in a ratio of between 1.5:1 and 7.0:1, and 0.2 to 0.9 weight percent citric acid; and
   20 to 45 wt % of a nylon glass fiber, wherein the composition contains less than 0.1 wt % of phosphinates and less than 0.1 wt % of impact modifiers and weight percent is based on the total weight of the composition.

37. The article of claim 36, wherein the polyphthalamide is present in an amount of 30 to 70 weight percent, the poly (phenylene ether) is present in an amount of 10 to 30 weight percent, and weight percent is based on the total weight of the composition.

38. The article of claim 36, wherein the polyphthalamide has a melting point greater than 290° C. and a glass transition temperature greater than or equal to 80° C.

39. The article of claim 36, wherein the composition is substantially free of added aliphatic polyamides.

40. The article of claim 36, wherein the glass fiber has an average diameter of 8 to 16 micrometers.

41. The article of claim 36, wherein the glass fiber has an average length of 2.8 to 3.6 millimeters.

42. The article of claim 36, wherein the composition further comprises a black pigment.

43. The article of claim 37, wherein the black pigment is carbon black and is present in an amount up to 0.5 weight percent, based on the total weight of the composition.

44. The article of claim 36, wherein the article wherein is selected from the group consisting of engine cooling components, engine fluid handling components, hoses, pumps, manifolds, turbo outlets, and fluid meters.

\* \* \* \* \*